(12) United States Patent
Kusumoto

(10) Patent No.: US 7,773,623 B2
(45) Date of Patent: Aug. 10, 2010

(54) COMMUNICATION DEVICE HAVING A BUFFER WITH A READ-OUT SPEED BASED ON A TRAFFIC VOLUME OF A DIFFERENT BUFFER

(75) Inventor: Yuichi Kusumoto, Tokyo (JP)

(73) Assignee: NEC Corporation, Tokyo (JP)

( * ) Notice: Subject to any disclaimer, the term of this patent is extended or adjusted under 35 U.S.C. 154(b) by 156 days.

(21) Appl. No.: 12/042,494

(22) Filed: Mar. 5, 2008

(65) Prior Publication Data

US 2008/0219165 A1 Sep. 11, 2008

(30) Foreign Application Priority Data

Mar. 7, 2007 (JP) .............................. 2007-056945

(51) Int. Cl.
*H04L 12/56* (2006.01)
(52) U.S. Cl. ..................... 370/414; 370/235; 370/395.4
(58) Field of Classification Search .................. None
See application file for complete search history.

(56) References Cited

U.S. PATENT DOCUMENTS

| | | | | |
|---|---|---|---|---|
| 6,480,911 | B1 * | 11/2002 | Lu ............................... | 710/54 |
| 6,546,017 | B1 | 4/2003 | Khaunte | |
| 7,106,745 | B2 * | 9/2006 | Kusumoto ............. | 370/395.41 |
| 7,321,940 | B1 * | 1/2008 | Smith et al. ................. | 709/240 |
| 7,522,609 | B2 * | 4/2009 | Cohen et al. ........... | 370/395.42 |
| 2004/0013089 | A1 * | 1/2004 | Taneja et al. ................ | 370/235 |
| 2004/0081167 | A1 * | 4/2004 | Hassan-Ali et al. .... | 370/395.42 |
| 2006/0242319 | A1 | 10/2006 | Sang et al. | |
| 2007/0038736 | A1 | 2/2007 | Jorgensen | |

FOREIGN PATENT DOCUMENTS

| | | |
|---|---|---|
| JP | 2000269970 A | 9/2000 |
| JP | 2001156785 A | 6/2001 |
| JP | 2001527368 A | 12/2001 |
| JP | 2002204257 A | 7/2002 |
| JP | 2003515273 A | 4/2003 |
| JP | 2004072569 A | 3/2004 |
| WO | 2004102905 A1 | 11/2004 |

OTHER PUBLICATIONS

European Search Report for EP Application No. 08004205.4 completed Jul. 1, 2008.

* cited by examiner

*Primary Examiner*—Donald L Mills

(57) ABSTRACT

A first controller calculates a first read-out speed based on the traffic volume in a first buffer and information of a request for the first read-out speed, sets the speed in a first scheduler. The first controller also generates information of a request for a second read-out speed based on the traffic volume in the first buffer. A second controller calculates the second read-out speed based on the traffic volume in a second buffer and the information of the request for the second read-out speed, sets the speed in a second scheduler. The second controller also generates information of a request for the first read-out speed based on the traffic volume in the second buffer.

7 Claims, 3 Drawing Sheets

COMMUNICATION DEVICE HAVING A BUFFER WITH A READ-OUT SPEED BASED ON A TRAFFIC VOLUME OF A DIFFERENT BUFFER

This application is based upon and claims the benefit of priority from Japanese Patent Application No. 2007-056945 filed on Mar. 7, 2007, the content of which is incorporated by reference.

BACKGROUND OF THE INVENTION

1. Field of the Invention

The present invention relates to a communication device that offers a plurality of layer functions, and particularly to flow control by the device.

2. Description of the Related Art

A communication system generally performs flow control for relief of congestion and prevention of data disposal (see Japanese Patent Laid-Open No. 2004-72569). The flow control temporally accumulates data in a buffer and adjusts the amount of data read out from the buffer, for example.

A communication system that has complex functions such as the W-CDMA and has a protocol configuration having a plurality of layers controls traffic according to a protocol in each layer. For example, a W-CDMA packet service connects a mobile terminal and a server using the TCP/IP. The TCP generally controls the data amount according to a slow start algorithm defined in the RFC2001 in data transmission from a server to a terminal.

A W-CDMA system needs to maintain a reserved band by taking into consideration the TCP/IP flow control to guarantee the communication quality. However, the specifications of TCP slow start partially depend on each application, hence it is difficult to predict how much traffic the W-CDMA system transfers on a network. Therefore, the W-CDMA system maintains more reserved bands than the actual traffic volume by allowing for a margin.

FIG. 1 is a graph showing the relation between a reserved band maintained by a W-CDMA system and the actual traffic volume at a TCP/IP level. Referring to FIG. 1, reserved band 91 maintained by a W-CDMA system is fixed to A. On the contrary, traffic volume 92 in a TCP/IP level significantly rises and falls over time.

Traffic volume 92 in a TCP/IP level exceeds the reserved band in part B in the drawing. The traffic volume rapidly decreases because of the flow control upon the occurrence of congestion, and then slowly recovers based on TCP slow start.

However, the above technique has the following problems.

The data amount controlled according to the TCP slow start is not notified to a protocol that has a layer that is lower than the level of the TCP/IP level. As such, it is difficult for a lower-level layer to recognize traffic using a method other than that by measuring the data amount in the layer. Normally, protocols do not cooperate in the traffic control. As a result, a line is not effectively used in a strict sense.

For example, in the slow start as shown in FIG. 1, it takes time until the traffic volume recovers to a level before congestion detection. Until the recovery, the state continues in which a reserved band is not effectively used.

As a practical method for recognizing the traffic volume, a method might be used that assumes average throughput and the number of users for each service, and that calculates throughput in each layer based on the assumption. However, average throughput and the number of users are different for each network. Therefore, it is difficult to obtain information to assume average throughput and the number of users that are accurate.

Further, a W-CDMA system has many connected classes and maximum rates. Furthermore, connectable rates for infrastructures are far more diverse than a second generation system due to the provision of services such as the HSDPA and the HSUPA. Because of the diversity of services for end users, a plurality of users connected at the same rate and in the same class may execute different applications. In that case, the users at the same rate and in the same class have different traffic profiles.

As described in the above, it is very difficult for a service connected on a communication infrastructure to calculate the average rate and the number of connections for each service.

A W-CDMA system uses ATM (Asynchronous Transfer Mode) in a transport layer. The ATM fee is very high in the European market. Therefore, mobile communication operators bear enormous cost as the ATM fee. As such, it is strongly desired to effectively use physical line resources.

The 3GPP (3rd Generation Partnership Project) has standardized the Transport Bearer Modification function. Correct application of the function serves to establish cooperation between a frame protocol and its lower ATM/AAL2 layer, and hence the physical line resources can be effectively used to a certain extent. However, a technique is desired to use a line more effectively in the above circumstances.

SUMMARY OF THE INVENTION

It is an exemplary object of the present invention to provide a communication system that can effectively use a line band.

To achieve the above object, a communication device according to an exemplary aspect of the present invention is a communication device having a protocol configuration having a plurality of layers, the device including a first buffer, a first scheduler, a second buffer, a second scheduler, a first controller and a second controller.

The first buffer in a higher-level layer retains inputted data that is readable. The first scheduler reads out data from said first buffer at a set first read-out speed. The second buffer in a lower-level layer retains the data read out from the first buffer that is readable. The second scheduler reads out the data from the second buffer at a set second read-out speed.

The first controller calculates the first read-out speed based on the traffic volume in the first buffer and information request for the first read-out speed, sets the speed in the first scheduler, and generates information request for the second read-out speed based on the traffic volume in the first buffer.

The second controller calculates the second read-out speed based on the traffic volume in the second buffer and the request information for the second read-out speed, sets the speed in the second scheduler, and generates request information for the first read-out speed based on the traffic volume in the second buffer.

The above and other objects, features, and advantages of the present invention will become apparent from the following description with reference to the accompanying drawings which illustrate examples of the present invention.

DETAILED DESCRIPTION OF THE PREFERRED EMBODIMENT(S)

The following will describe exemplary embodiments to carry out the present invention in detail with reference to the drawings.

Figure 1:
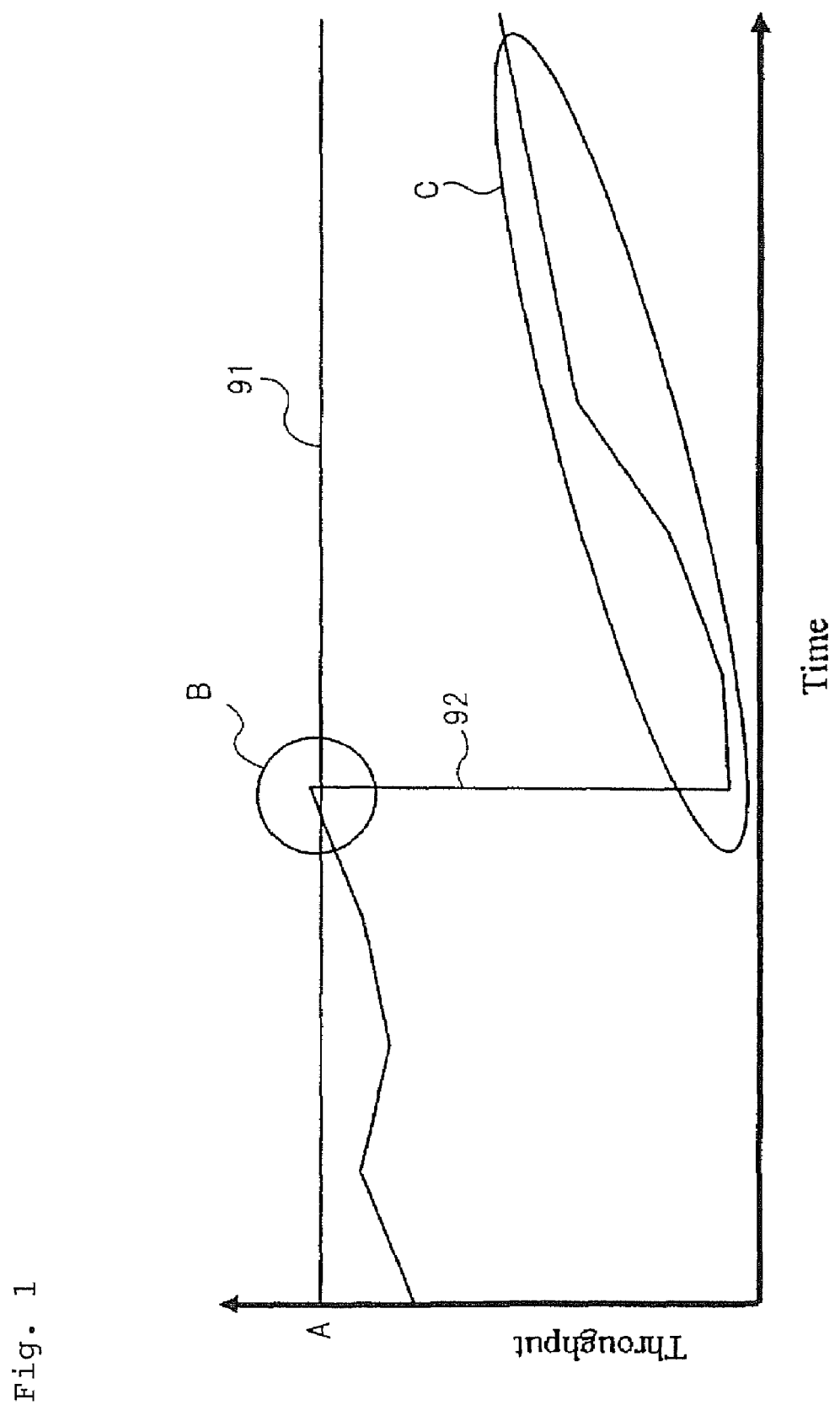
FIG. 1 is a graph showing the relation between a reserved band maintained by a W-CDMA system and the actual traffic volume at a TCP/IP level.
Figure 2:
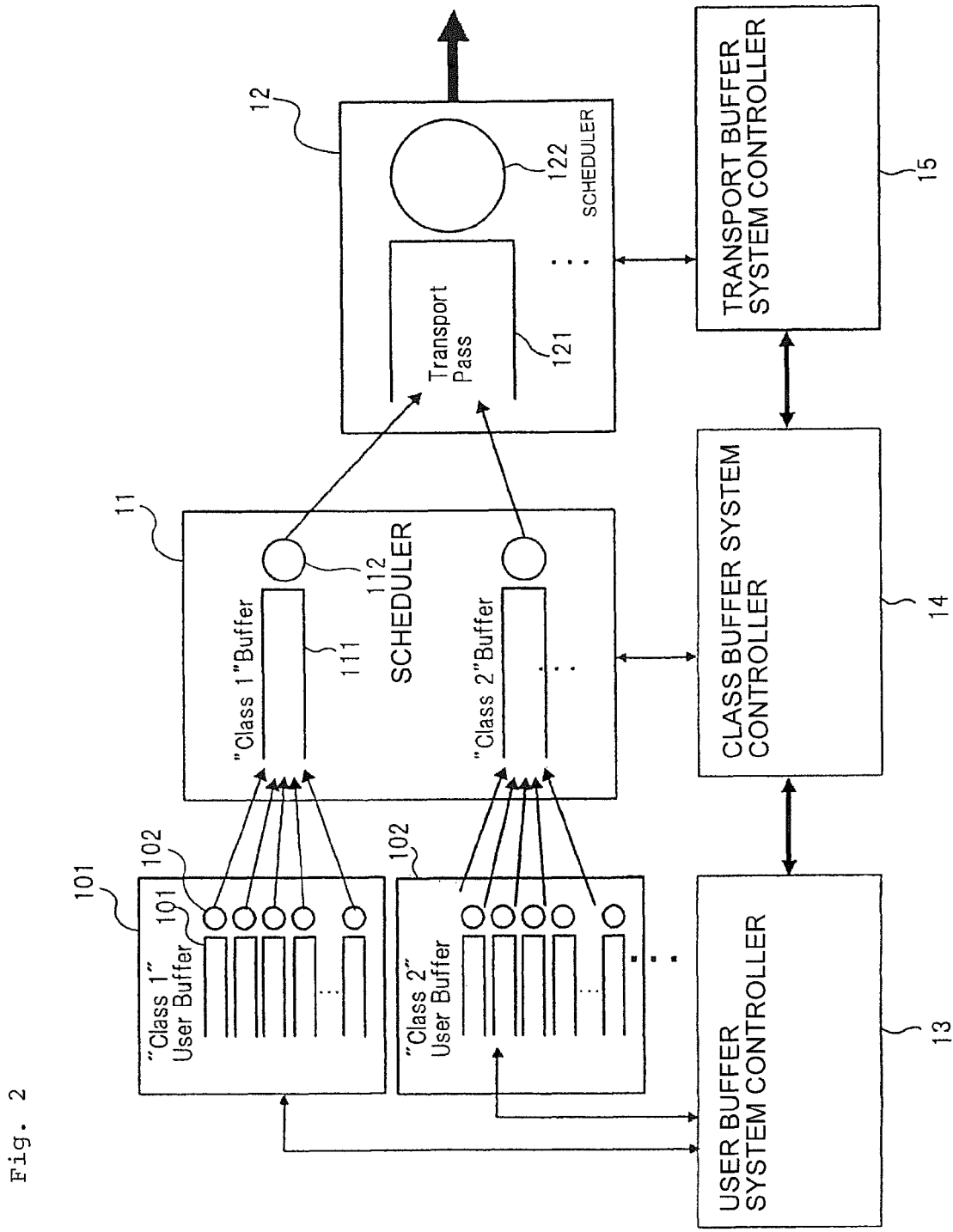
FIG. 2 is a block diagram showing the configuration of a communication device according to one exemplary embodiment.

FIG. 2 is a block diagram showing the configuration of a communication device according to one exemplary embodiment. The communication device according to the present invention is a device for receiving data from each user, multiplexing each class of data, and further multiplexing each class of data in a transport path.

Referring to FIG. 2, the communication device includes user buffer systems $10_1$ and $10_2$, class buffer system 11, transport buffer system 12, user buffer system controller 13, class buffer system controller 14 and transport buffer system controller 15.

Each of user buffer systems $10_1$ and $10_2$ comprises a plurality of user buffers 101 and a plurality of schedulers 102 defined for respective users. User buffer systems 101 and 102 store data from the respective users in each of a plurality of user buffers 101 and read out the data of each user buffer 101 at the read-out speed that is set by user buffer system controller 13 in scheduler 102. User buffer systems $10_1$ and $10_2$ also monitor a change of the traffic volume for each user and notify user buffer system controller 13 of the change. The traffic volume means the amount of data accumulated in a buffer, for example. By way of another example, the throughput actually designated by the scheduler can be an indicator of the data amount.

Class buffer system 11 comprises a plurality of class buffers 111 defined for respective classes to which the users belong and a plurality of schedulers 112. Class buffer system 11 multiplexes each class of data read out from each user buffer 101 of user buffer systems $10_1$ and $10_2$, stores the data in each of the plurality of class buffers 111, and reads out the data in each class buffer 111 at the read-out speed that is set by class buffer system controller 14 in scheduler 112. Class buffer system 11 also monitors a change of the traffic volume of each class and notifies class buffer system controller 14 of the change. The traffic volume means the amount of data accumulated in a buffer, for example. By way of another example, the throughput actually designated by the scheduler can be an indicator of the data amount.

Transport buffer system 12 comprises transport buffer 121 and scheduler 122 defined for a transport path in which a plurality of classes are multiplexed. Transport buffer system 12 multiplexes data read out from each class buffer 111 in class buffer system 11 in a transport path, stores the data in transport buffer 121, and reads out the data from transport buffer 121 at the read-out speed that is set by transport buffer system controller 15 in scheduler 122. Transport buffer system 12 also monitors a change of the traffic volume in the transport path and notifies transport buffer system controller 15 of the change. The traffic volume means the amount of data accumulated in a buffer, for example. By way of another example, the throughput actually designated by the scheduler can be an indicator of the data amount.

User buffer system controller 13 is defined for each class. User buffer system controller 13 calculates the read-out speed of each user buffer 101 based on request information that is requested by class buffer system controller 14 in a lower-level layer or based on a change of the traffic volume for each user notified by user buffer systems $10_1$ and $10_2$, and sets the result in user buffer systems $10_1$ and $10_2$.

User buffer system controller 13 also generates the request information of the request for the read-out speed to class buffer system controller 14 in the lower-level layer based on the change of the traffic volume for each user notified by user buffer systems $10_1$ and $10_2$, and sends the result to class buffer system controller 14.

For example, if the total traffic volume of user buffers 101 for users who belong to the same class increases, user buffer system controller 13 tries to increase the read-out speed of each user buffer 101. The increase of the traffic volume can be determined when a pre-determined threshold has been exceeded. If the read-out speed for each user buffer 101 increases, the traffic volume increases that flows into class buffer 111 for a class to which the user belongs. Accordingly, user buffer system controller 13 preferably requests class buffer system controller 14 to increase the read-out speed.

Class buffer system controller 14 calculates the read-out speed for each class buffer 111 based on a request by transport buffer system controller 15 in a lower-level layer, information of a request by user buffer system controller 13 in a higher-level layer, or a change of the traffic volume for each class notified by class buffer system 11, and sets the result in class buffer system 11.

Class buffer system controller 14 also generates request information of a request for the read-out speed to transport buffer system controller 15 in a lower-level layer, and request information of a request for the read-out speed to user buffer system controller 13 in a higher-level layer based on the change of the traffic volume for each class notified by user buffer system 11, and sends the request information to each of transport buffer system controller 15 and user buffer system controller 13.

For example, when the traffic volume of class buffer 111 for a certain class increases, class buffer system controller 14 tries to increase the read-out speed for that class buffer 111. At that time, class buffer system controller 14 preferably requests user buffer system controller 13 in a higher-level layer to decrease the read-out speed for user buffer 101 for a user who belongs to the class.

Also for example, when the traffic volumes of class buffers for classes multiplexed in the same transport path totally increase, class buffer system controller 14 tries to increase the read-out speed of each class buffer 111. If the read-out speeds for respective class buffers 111 increase, the traffic volume that flows into transport buffer 121 of the transport path in which the classes are multiplexed increases. Accordingly, class buffer system controller 14 preferably requests transport buffer system controller 15 to increase the read-out speed.

Transport buffer system controller 15 calculates the read-out speed for transport buffer 121 based on a request by class buffer system controller 14 in a higher-level layer or based on a change of the traffic volume in transport path 121 notified by transport buffer system 12, and sets the result in transport buffer system 12.

Transport buffer system controller 15 also generates request information of a request for the read-out speed to class buffer system controller 14 in a higher-level layer based on the change of the traffic volume of transport notified by transport buffer system 12, and sends the information to class buffer system controller 14.

For example, when the traffic volume in transport buffer 121 for a certain transport path increases, transport buffer system controller 15 tries to increase the read-out speed for that transport buffer 121. At that time, transport buffer system controller 15 preferably requests class buffer system controller 14 in a higher-level layer to decrease the read-out speeds for class buffers 111 for classes multiplexed in the transport path.

This exemplary embodiment comprises a buffer system that can control the flow in each layer. A buffer system controller in each layer adjusts the read-out speed for the buffer system in that layer and a higher-level layer and a lower-level layer each requests the other to provide the read-out speed. Therefore, the layers cooperate in the flow control, thereby improving the use efficiency of a band. For example, if bursty traffic occurs, the layers cooperate to restrain an overflow in each buffer, thus making effective use of a line. Moreover, the respective layers cooperate in the processing while maintaining independence, thereby minimizing mutual relations between the layers in network design.

The functions of user buffer system controller 13, class buffer system controller 14 and transport buffer system controller 15 in this exemplary embodiment can also be realized by a processor executing a software program.

Next, a more specific exemplary embodiment of the communication system according to this exemplary embodiment will be described.

Figure 3:
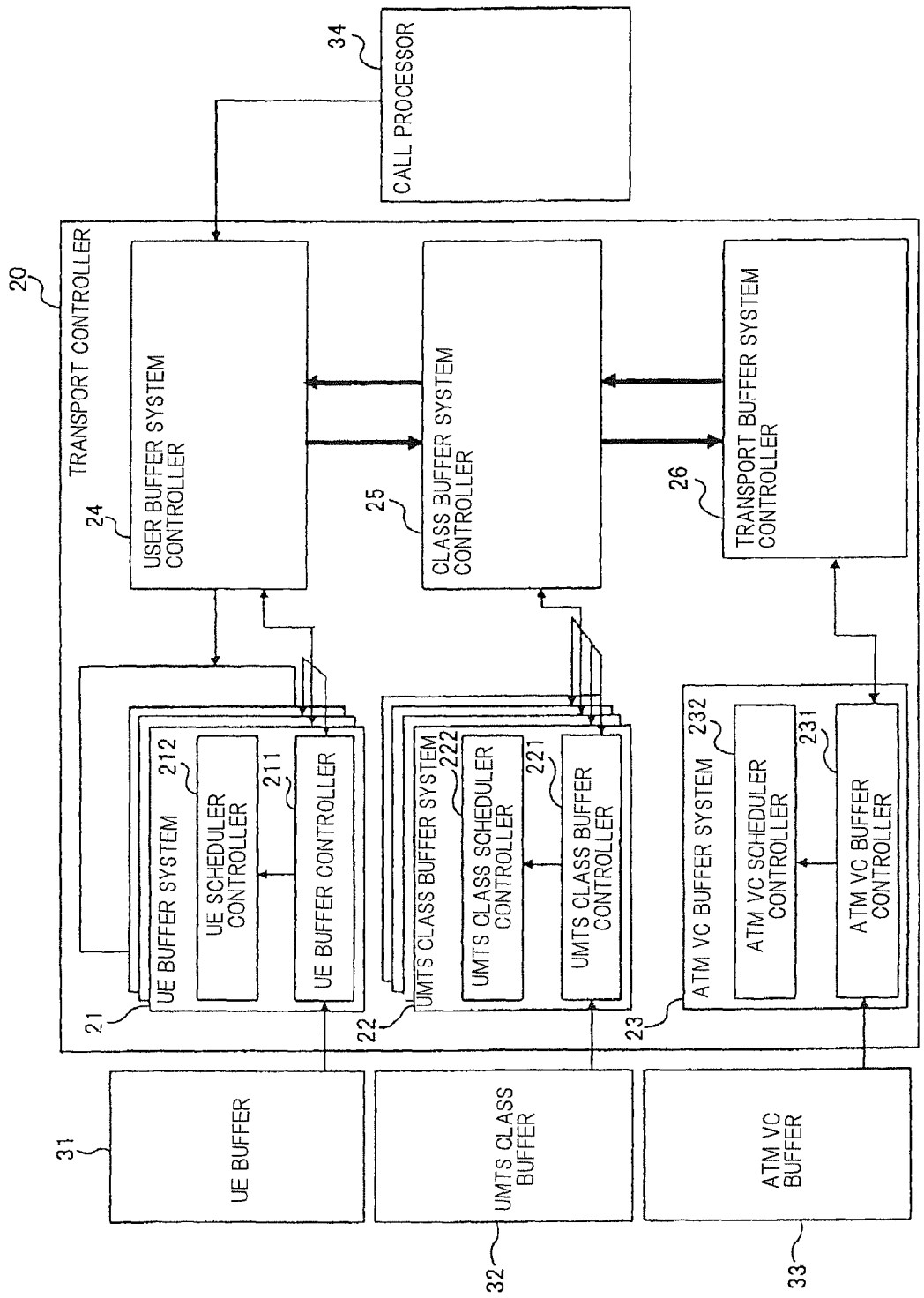
FIG. 3 is a block diagram showing the configuration of a communication device according to an example.

FIG. 3 is a block diagram showing the configuration of a communication device according to an example. Referring to FIG. 3, a communication device includes transport controller 20, UE (User Equipment) buffer 31, UMTS (Universal Mobile Telecommunications System) class buffer 32, ATM VC (Asynchronous Transfer Mode Virtual Channel) buffer 33 and call processor 34.

Transport controller 20 includes UE buffer system 21, UMTS class buffer system 22, ATM VC buffer system 23, user buffer system controller 24, class buffer system controller 25 and transport buffer system controller 26.

Call processor 34 executes a sequence of procedures for call processing by using user equipment (UE) and sets a call. The information of the call being set is notified to transport controller 20. Transport controller 20 connects a data route for the call via UE buffer 31, UMTS class buffer 32 and ATM VC buffer 33 according to the notified call information.

UE buffer system 21 includes UE buffer controller 211 and UE scheduler controller 212.

UMTS class buffer system 22 includes UMTS class buffer controller 221 and UMTS class scheduler controller 222.

ATM VC buffer system 23 includes ATM VC buffer controller 231 and ATM VC scheduler controller 232.

UE buffer 31 comprises a buffer and a scheduler (not shown). Buffer 31 temporally saves, for each user, all traffic data identified for each user according to a protocol for the user assigned to each user. The data being temporally saved in UE buffer 31 is the payload of a frame in a layer to which UE buffer 31 belongs. UE buffer 31 reads out the temporally saved data at the read-out speed that is set by a scheduler. UE buffer 31 also periodically reports the traffic volume for the relevant user to UE buffer controller 211 of UE buffer system 21.

UE buffer controller 211 is defined for each class. The controller reports a change of the traffic volume for each user reported by UE buffer 31 to UE buffer system controller 24. UE buffer controller 211 also indicates the read-out speed for each user indicated by UE buffer system controller 24 to UE scheduler controller 212.

UE scheduler controller 212 is defined for each class. The controller sets the read-out speed for a user indicated by UE buffer controller 211 in the scheduler of UE buffer 31.

UMTS class buffer 32 comprises a buffer and a scheduler (not shown). The buffer temporally saves, for each class, traffic data of all classes defined according to a protocol assigned for each class in the layer that is lower than the level of UE buffer 31. The data being temporally saved in UMTS class buffer 32 is the payload of a frame in a layer to which UMTS class buffer 32 belongs. UMTS buffer 32 reads out the temporally saved data at the read-out speed that is set in the scheduler. UMTS class buffer 32 also reports periodically the traffic volume for the relevant class to UMTS class buffer controller 221.

UMTS class buffer controller 221 reports the traffic volume for the relevant class reported by UMTS class buffer 32 to class buffer system controller 25. UMTS class buffer controller 221 also indicates the read-out speed for each class indicated by class buffer system controller 25 to UMTS class scheduler controller 222.

UMTS class scheduler controller 222 sets the read-out speed for a user indicated by UMTS class buffer controller 221 in the scheduler of the UMTS class buffer.

ATM VC buffer 33 comprises a buffer and a scheduler (not shown). The buffer temporally saves, for each transport path, data transmitted to a transport path that is assigned for each transport path and in which classes are multiplexed. The data being temporally saved in ATM VC buffer 33 is the payload of a frame in a layer to which ATM VC buffer 33 belongs. ATM VC buffer 33 reads out the temporally saved data at the read-out speed that is set in the scheduler. ATM VC buffer 33 also periodically reports the traffic volume in the relevant transport path to ATM VC buffer controller 231.

ATM VC buffer controller 231 reports the traffic volume in the relevant transport path reported by ATM VC buffer 33 to transport buffer system controller 26. ATM VC buffer controller 231 also indicates the read-out speed for each transport path indicated by transport buffer system controller 26 to ATM VC scheduler controller 232.

ATM VC scheduler controller 232 sets the read-out speed for the transport path indicated by ATM VC buffer controller 231 in the scheduler of ATM VC buffer 33.

User buffer system controller 24 calculates the read-out speed for each UE buffer 31 based on a change of the traffic volume for each user reported by UE buffer controller 211, and indicates the result to UE buffer controller 211. For example, when UE buffer controller 211 reports disposal of the data, user buffer system controller 24 increases the read-out speed for the relevant UE buffer 31.

User buffer system controller 24 also calculates a change of the traffic volume for a class based on a change of the traffic volume for each user reported by UE buffer controller 211, generates request information of a request for the read-out speed to class buffer system controller 25 based on the change of the traffic volume for the class, and sends the information to class buffer system controller 25.

User buffer system controller 24 also calculates the read-out speed for each UE buffer 31 based on the request information from class buffer system controller 25, and indicates the speed to UE buffer controller 211.

Class buffer system controller 25 calculates the read-out speed for each UMTS class buffer 32 based on a change of the traffic volume for each class reported by UMTS class buffer controller 221 and indicates the speed to UMTS class buffer controller 221. Controller 25 generates request information of a request for the read-out speed for UE buffer 31 to user buffer system controller 24 and sends the information to user buffer system controller 24. For example, when UMTS class buffer controller 221 reports disposal of data, class buffer system controller 25 requests user buffer system controller 24 to increase the read-out speed for relevant UMTS buffer 32 and to decrease the read-out speed for each UE buffer 31 corresponding to UMTS class buffer 32 that has encountered the data disposal.

Class buffer system controller 25 also calculates a change of the traffic volume for a transport path based on a change of the traffic volume for each class reported by UMTS class buffer controller 221, generates request information of the read-out speed for transport buffer system controller 26 based on the change of the traffic volume for the transport path, and sends the information to transport buffer system controller 26.

Class buffer system controller 25 also calculates the read-out speed for each UMTS class buffer 32 based on the request information from user buffer system controller 24 or transport buffer system controller 26, and indicates the speed to UMTS class buffer controller 221.

Transport buffer system controller 26 calculates the read-out speed for each ATM VC buffer 33 based on a change of the traffic volume in each transport path reported by ATM VC buffer controller 231 and indicates the speed to ATM VC buffer controller 231. Controller 26 generates request information of a request for the read-out speed for UMTS class buffer 32 to class buffer system controller 25 and sends the information to class buffer system controller 25. For example, when ATM VC buffer controller 231 reports disposal of data, transport buffer system controller 26 requests class buffer system controller 25 to increase the read-out speed for relevant ATM VC buffer 33 and to decrease the read-out speed for each UMTS class buffer 32 corresponding to ATM VC buffer 33 that has encountered the data disposal.

Transport buffer system controller 26 also calculates the read-out speed for ATM VC buffer 33 based on the request information from class buffer system controller 25 and indicates the speed to ATM VC buffer controller 231.

This example comprises a system that can control a flow in a buffer in each layer. A buffer system controller in each layer adjusts the read-out speed for the buffer in that layer and a higher level layer and a lower layer each requests the other to provide the read out speed. Therefore, the layers cooperate in the flow control, thereby improving the use efficiency of a band.

The functions of user buffer system controller 24, class buffer system controller 25 and transport buffer system controller 26 in this example can also be realized by execution of a software program by a processor.

As yet another example, the exemplary embodiment shown in FIG. 2 can be applied to a communication device using the IP (Internet protocol). In that case, a buffer of class buffer system 11 in FIG. 2 is set for each DiffServ Code Point in an IP layer, and a buffer of transport buffer system 12 is defined for each path that is connected according to IP.

While preferred exemplary embodiments of the present invention have been described using specific terms, such description is for illustrative purposes only, and it is to be understood that changes and variations may be made without departing from the spirit or scope of the following claims.

What is claimed is:

1. A communication device in protocol configuration having a plurality of layers, said device including:
    a first buffer in a higher-level layer for retaining inputted data that is readable;
    a first scheduler for reading out data from said first buffer at a first readout speed that is set;
    a second buffer in a lower-level layer for retaining the data read out from said first buffer that is readable;
    a second scheduler for reading out data from said second buffer at a second read-out speed that is set;
    a first controller for calculating said first read-out speed based on a traffic volume in said first buffer and request information of said first read-out speed, setting the speed in said first scheduler, and generating request information of said second read-out speed based on the traffic volume in said first buffer such that said second read-out speed is calculated based on the traffic volume in said first buffer; and
    a second controller for calculating said second read-out speed also based on a traffic volume in said second buffer and request information of said second readout speed, setting the speed in said second scheduler, and generating request information of said first read-out speed based on the traffic volume in said second buffer, such that said first read-out speed is calculated also based on the traffic volume in said second buffer.

2. The communication device according to claim 1 including a plurality of first buffers corresponding to the second buffer, wherein data read out from said plurality of first buffers is multiplexed and retained in said second buffer; and
    wherein said first controller generates request information to increase said second read-out speed and sends the information to said second controller if a threshold is exceeded by the traffic volume in said second buffer corresponding to said plurality of first buffers calculated from the traffic volume in said plurality of first buffers.

3. The communication device according to claim 1 including a plurality of first buffers corresponding to the second buffer, wherein data read out from said plurality of first buffers is multiplexed and retained in said second buffer; and
    wherein said second controller generates request information to increase said second read-out speed and to decrease the first read-out speed for said plurality of first buffers corresponding to said second buffer and sends the information to said first controller if the traffic volume in said second buffer exceeds a threshold.

4. The communication device according to claim 1 wherein said first controller controls said first read-out speed based on a change of the traffic volume in said first buffer.

5. The communication device according to claim 1 wherein said second controller controls said second read-out speed based on a change of the traffic volume in said second buffer.

6. The communication device according to claim 1 wherein:
    the traffic volume in said first buffer is the amount of data accumulated in said first buffer; and
    the traffic volume in said second buffer is the amount of data accumulated in said second buffer.

7. The communication device according to claims 1 including a first layer, a second layer and a third layer from lower to higher in that order, wherein a relation between said first layer and said second layer and a relation between said second layer and said third layer both operate as a relation between said lower-level layer and said higher-level layer.

* * * * *